(12) United States Patent
Baikerikar et al.

(10) Patent No.: US 10,640,581 B2
(45) Date of Patent: May 5, 2020

(54) WATERBORNE DAMPING COMPOSITION

(71) Applicants: Dow Global Technologies LLC, Midland, MI (US); Rohm and Haas Company, Collegeville, PA (US)

(72) Inventors: Kiran K. Baikerikar, Collegeville, PA (US); Ray E. Drumright, Midland, MI (US); Zhenwen Fu, Norristown, PA (US); Justin Gimbal, Collegeville, PA (US); Craig F. Gorin, Midland, MI (US); Mark Langille, Audubon, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 8 days.

(21) Appl. No.: 16/127,749

(22) Filed: Sep. 11, 2018

(65) Prior Publication Data
US 2019/0106512 A1   Apr. 11, 2019

Related U.S. Application Data

(60) Provisional application No. 62/570,707, filed on Oct. 11, 2017.

(51) Int. Cl.
| | | |
|---|---|---|
| *C09D 5/02* | (2006.01) | |
| *C09D 133/02* | (2006.01) | |
| *C09D 163/00* | (2006.01) | |
| *C08K 5/00* | (2006.01) | |
| *C08F 2/22* | (2006.01) | |
| *C08F 220/06* | (2006.01) | |
| *C08F 220/58* | (2006.01) | |
| *C08F 222/06* | (2006.01) | |
| *C08F 230/02* | (2006.01) | |
| *C08G 59/14* | (2006.01) | |
| *C09D 167/00* | (2006.01) | |
| *C08G 59/06* | (2006.01) | |
| *C09D 5/00* | (2006.01) | |

(52) U.S. Cl.
CPC ............. *C08F 2/22* (2013.01); *C08F 220/06* (2013.01); *C08F 220/58* (2013.01); *C08F 222/06* (2013.01); *C08F 230/02* (2013.01); *C08G 59/063* (2013.01); *C08G 59/145* (2013.01); *C09D 5/00* (2013.01); *C09D 5/027* (2013.01); *C09D 5/028* (2013.01); *C09D 163/00* (2013.01); *C09D 167/00* (2013.01); *C08G 2350/00* (2013.01)

(58) Field of Classification Search
CPC ........................... C08K 5/0025; C08K 5/1515
See application file for complete search history.

(56) References Cited

U.S. PATENT DOCUMENTS

| | | | |
|---|---|---|---|
| 4,325,856 A | 4/1982 | Ishikawa et al. | |
| 4,384,056 A | 5/1983 | Schmidt et al. | |
| 4,391,857 A | 7/1983 | Saito et al. | |
| 4,539,361 A | 9/1985 | Siol et al. | |
| 4,654,397 A | 3/1987 | Mueller-Mall et al. | |
| 4,814,373 A | 3/1989 | Frankel et al. | |
| 8,664,286 B2 * | 3/2014 | Yasui | C08F 265/04 521/134 |
| 2007/0049697 A1 * | 3/2007 | Miyawaki | C08F 2/26 525/320 |
| 2008/0090948 A1 | 4/2008 | DeWitt et al. | |
| 2011/0060066 A1 | 3/2011 | Yokota et al. | |
| 2016/0168411 A1 | 6/2016 | Wang et al. | |
| 2016/0168413 A1 | 6/2016 | Chao et al. | |

FOREIGN PATENT DOCUMENTS

| | | |
|---|---|---|
| CN | 101125904 A | 2/2008 |
| DE | 102006052282 A1 | 5/2008 |
| JP | 1982055970 | 9/1980 |
| JP | 2000178499 A | 6/2000 |
| RU | 2039779 C1 | 7/1995 |
| RU | 2408637 C1 | 1/2011 |
| WO | 2007034933 A1 | 3/2007 |
| WO | 2018102331 A1 | 6/2018 |

OTHER PUBLICATIONS

European Search Report for the corresponding EP Application No. EP18199206; European Filing Date: Oct. 8, 2018; dated Feb. 18, 2019; 2 Pages.

* cited by examiner

*Primary Examiner* — Vu A Nguyen
(74) *Attorney, Agent, or Firm* — Karl E. Stauss; Cantor Colburn LLP

(57) ABSTRACT

A waterborne sound and vibration damping composition including a waterborne emulsion polymer, the polymer having a calculated acid number of from 2 to 100; from 0.1% to 50%, solids based on emulsion polymer solids, of certain liquid compounds having a boiling point greater than 150° C.; and a solid filler at a level of from 25% to 85% PVC; wherein the waterborne damping composition has a water content of from 6% to 25% by weight is provided. A method for providing a coated substrate using the waterborne damping composition and a substrate so coated are also provided.

13 Claims, No Drawings

WATERBORNE DAMPING COMPOSITION

This invention relates to a waterborne damping composition. This invention particularly relates to a waterborne liquid sound damping composition, a method for providing sound and vibration damping to a substrate and a coated substrate formed by that method. More particularly, this invention relates to a waterborne damping composition including: a waterborne emulsion polymer, the polymer having a calculated acid number of from 2 to 100; from 0.1% to 50%, solids based on emulsion polymer solids, of a liquid compound having a boiling point greater than 150° C. selected from the group consisting of acid group-reactive liquid compounds and non-acid group-reactive liquid compounds, or mixtures thereof; and a solid filler; wherein the waterborne damping composition has a PVC of from 25% to 85%; and wherein the waterborne damping composition has a water content of from 6% to 25% by weight.

The present invention serves to provide a waterborne damping composition, i.e., a waterborne liquid sound and vibration damping composition, a method for applying the damping composition to a substrate and the coated substrate so formed, the dry coating preferably having substantially improved water resistance relative to emulsion polymer based coatings not of the present invention, good appearance properties, and good damping characteristics.

U.S. Patent Applications No. 2016/0168411 A1 and No. 2016/0168413 A1 disclose non-aqueous coating compositions having a measured solids content of greater than 95% including a polymeric component and a reactive diluent for sound and vibration damping and water resistance.

However, waterborne liquid sound and vibration damping compositions are still desired. A waterborne damping composition, including a waterborne emulsion polymer, having improved water resistance, when dried/cured, relative to conventional waterborne coatings has been provided. The waterborne damping composition also provides minimal environmental and safety concerns. Further, a waterborne coating is lighter for a given thickness relative to non-aqueous coatings which is beneficial for automotive applications that require lightweight materials; this is due to the facts that the preferred baking process for such applications causes expansion of the coating and the known thickness dependence of sound damping. The problem faced by the inventors is the provision of a waterborne liquid sound damping composition having, as a dried/cured coating, a desirable level of sound damping performance, appearance, and water resistance.

In a first aspect of the present invention there is provided a waterborne damping composition comprising: a waterborne emulsion polymer, said polymer having a calculated acid number of from 2 to 100; from 0.1% to 50%, solids based on emulsion polymer solids, of a liquid compound having a boiling point greater than 150° C. selected from the group consisting of acid group-reactive liquid compounds and non-acid group-reactive liquid compounds; and a solid filler; wherein said waterborne damping composition has a PVC of from 25% to 85%; and wherein said waterborne damping composition has a water content of from 6% to 25% by weight.

In a second aspect of the present invention there is provided a method for providing a coated substrate comprising (a) forming a waterborne damping composition comprising: a waterborne emulsion polymer, said polymer having a calculated acid number of from 2 to 100; from 0.1% to 50%, solids based on emulsion polymer solids, of a liquid compound having a boiling point greater than 150° C. selected from the group consisting of acid group-reactive liquid compounds and non-acid group-reactive liquid compounds; and a solid filler; wherein said waterborne damping composition has a PVC of from 25% to 85%; and wherein said waterborne damping composition has a water content of from 6% to 25% by weight; (b) applying said waterborne damping composition to a substrate; and (c) drying said applied waterborne damping composition at a temperature of from 25° C. to 250° C.

In a third aspect of the present invention there is provided a coated substrate formed by the method of the second aspect of the present invention.

The waterborne damping composition of the present invention includes a waterborne emulsion polymer, the polymer having a calculated acid number of from 2 to 100, alternatively of from 2 to 65. By "waterborne" herein is meant that the waterborne damping composition and the waterborne emulsion polymer each have a single continuous phase composed of from 70% to 100%, by weight, water. Optional additional ingredients in that phase are typically water-miscible. By "emulsion polymer" is meant a polymer prepared by the free radical addition polymerization of ethylenically-unsaturated monomers in an aqueous emulsion polymerization process. The emulsion polymer has a calculated acid number of from 2 to 100, alternatively of from 2 to 65. The "acid number" herein is that calculated by determining the number of milliequivalents of acid per gram in the dry emulsion polymer solids and multiplying by the molecular weight of potassium hydroxide. The acid number of the emulsion polymer is provided by the copolymerization of one or more acid group-containing monomers selected from the group including carboxylic acid monomers, Sulfur-containing acid group monomers, Phosphorous-containing acid group monomers, salts of each group thereof, and mixtures of any of the foregoing monomers. Typical carboxylic acid monomers include, for example, acrylic acid, methacrylic acid, crotonic acid, itaconic acid, fumaric acid, maleic acid, monomethyl itaconate, monomethyl fumarate, monobutyl fumarate, and maleic anhydride. Typical Sulfur-containing monomers include, for example, 2-acrylamido-2-methyl-1-propanesulfonic acid, sulfoethyl (meth)acrylate, and vinyl sulfonic acid and sodium styrene sulfonate. Typical Phosphorous-containing acid monomers include dihydrogen phosphate-functional monomers such as dihydrogen phosphate esters of an alcohol in which the alcohol also contains a polymerizable vinyl or olefinic group, such as allyl phosphate, mono- or diphosphate of bis(hydroxy-methyl) fumarate or itaconate, derivatives of (meth)acrylic acid esters, such as, for examples phosphates of hydroxyalkyl(meth)acrylates including 2-hydroxyethyl (meth)acrylate, 3-hydroxypropyl (meth)acrylates, and the like. Other suitable phosphorous acid monomers include $CH_2=C(R)-C(O)-O-(R1O)n-P(O)(OH)_2$, where R=H or $CH_3$ and R1=alkyl, such as SIPOMER™ PAM-100, SIPOMER™ PAM-200, SIPOMER™ PAM-300, and SIPOMER™ PAM-4000, available from Rhodia, Inc. Other suitable Phosphorus-containing acid monomers are phosphonate functional monomers, disclosed in WO 99/25780 A1, and include vinyl phosphonic acid, allyl phosphonic acid, 2-acrylamido-2-methylpropanephosphonic acid, α-phosphonostyrene, 2-methylacrylamido-2-methylpropanephosphonic acid. Further suitable Phosphorus-containing monomers are Harcross T-Mulz 1228 and 1,2-ethylenically unsaturated (hydroxy)phosphinylalkyl (meth)acrylate monomers, disclosed in U.S. Pat. No. 4,733,005, and include (hydroxy)phosphinylmethyl methacrylate. Preferred phosphorus acid monomers are dihydrogen phosphate monomers, which include 2-phosphoethyl (meth)acrylate, 2-phosphopropyl (meth) acrylate, 3-phosphopropyl (meth)acrylate, and 3-phospho-2-hydroxypropyl (meth) acrylate. Preferred are 2-phosphoethyl (meth)acrylate, 2-phosphopropyl (meth) acrylate, 3-phosphopropyl (meth)acrylate, 3-phospho-2-hydroxypropyl (meth)acrylate, SIPOMER™ PAM-100, and SIPOMER™ PAM-200.

In addition to the acid group-containing monomer the emulsion polymer of the present invention includes at least one nonionic copolymerized monoethylenically unsaturated monomer such as, for example, a (meth)acrylic ester monomer including methyl (meth)acrylate, ethyl (meth)acrylate, butyl (meth)acrylate, 2-ethylhexyl (meth)acrylate, decyl (meth)acrylate; hydroxyalkyl (meth)acrylates such as, for example, hydroxyethyl (meth)acrylate and hydroxypropyl (meth)acrylate, and alkoxylated analogues thereof; ureido-functional (meth)acrylates and acetoacetates, acetamides or cyanoacetates of (meth)acrylic acid; styrene or substituted styrenes; vinyl toluene; monoethylenically unsaturated acetophenone or benzophenone derivatives such as, for example are taught in U.S. Pat. No. 5,162,415; vinyl acetate or other vinyl esters; vinyl monomers such as vinyl chloride, vinylidene chloride, N-vinyl pyrollidone; and (meth)acrylonitrile. The use of the term "(meth)" followed by another term such as (meth)acrylate or (meth)acrylamide, as used throughout the disclosure, refers to both acrylates and methacrylates, and acrylamides or methacrylamides, respectively.

In various embodiments the emulsion polymer includes from 0% to 6%, by weight; or in the alternative, from 0% to 1%, by weight; or from 0% to 0.2%, by weight; based on the weight of the emulsion polymer solids, of a copolymerized multi-ethylenically unsaturated monomer. In certain embodiments the emulsion polymer, independently, is free from copolymerized multi-ethylenically unsaturated monomer. Multi-ethylenically unsaturated monomers include, for example, allyl (meth) acrylate, diallyl phthalate, butadiene, 1,4-butylene glycol di(meth)acrylate, 1,2-ethylene glycol di(meth)acrylate, 1,6-hexanediol di(meth)acrylate, and divinyl benzene.

The calculated glass transition temperature ("Tg") of the emulsion polymer is typically from 0° C. to 110° C., preferably from 5° C. to 70° C. It is believed that the desired damping temperature range is dependent on the emulsion polymer calculated Tg. Tgs of the polymers are calculated herein by using the Fox equation (T. G. Fox, Bull. Am. Physics Soc., Volume 1, Issue No. 3, page 123(1956)), that is, for calculating the Tg of a copolymer of monomers M1 and M2, $$1/Tg(\text{calc.}) = w(M1)/Tg(M1) + w(M2)/Tg(M2),$$

wherein
$Tg(\text{calc.})$ is the glass transition temperature calculated for the copolymer
$w(M1)$ is the weight fraction of monomer M1 in the copolymer
$w(M2)$ is the weight fraction of monomer M2 in the copolymer
$Tg(M1)$ is the glass transition temperature of the homopolymer of M1
$Tg(M2)$ is the glass transition temperature of the homopolymer of M2,
all temperatures being in ° K.

The glass transition temperature of homopolymers may be found, for example, in "Polymer Handbook", edited by J. Brandrup and E. H. Immergut, Interscience Publishers.

The waterborne emulsion polymer desirably has solids content greater than 50% on a weight basis; preferably the solids content is greater than 56% on a weight basis.

The polymerization techniques used to prepare such waterborne emulsion-polymers are well known in the art such as, for example, as disclosed in U.S. Pat. Nos. 4,325,856; 4,654,397; and 4,814,373. Conventional surfactants may be used such as, for example, anionic and/or nonionic emulsifiers such as, for example, alkali metal or ammonium alkyl sulfates, alkyl sulfonic acids, fatty acids, and oxyethylated alkyl phenols. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, t-amyl hydroperoxide, ammonium and/or alkali persulfates, typically at a level of 0.01% to 3.0% by weight, based on the weight of total monomer. Redox systems using the same initiators coupled with a suitable reductant such as, for example, sodium sulfoxylate formaldehyde, sodium hydrosulfite, isoascorbic acid, hydroxylamine sulfate and sodium bisulfite may be used at similar levels, optionally in combination with metal ions such as, for example iron and copper, optionally further including complexing agents for the metal. Redox processes are preferred. The monomer mixture for a stage may be added neat or as an emulsion in water. The monomer mixture for a stage may be added in a single addition or more additions or continuously over the reaction period allotted for that stage using a uniform or varying composition; preferred is the addition of the first and/or second polymer monomer emulsion as a single addition. Additional ingredients such as, for example, free radical initiators, oxidants, reducing agents, chain transfer agents, neutralizers, surfactants, and dispersants may be added prior to, during, or subsequent to any of the stages. Neutralizers can be selected from mineral bases such as sodium hydroxide, potassium hydroxide, salts of phosphoric acid, organic amines such as, for example, hydroxyalkyl amines, and ammonia.

Formation of the emulsion polymer by a multistage process that facilitates various particle morphologies is well-known in the art and is also contemplated in the present invention; in this case the acid number of the overall emulsion polymer is determined regardless of the various compositions that may exist within the particles.

The average particle diameter of the emulsion-polymerized polymer particles is typically from 30 to 500 nanometers, preferably from 80 to 200 nanometers. Processes yielding polymodal particle size distributions such as those disclosed in U.S. Pat. Nos. 4,384,056 and 4,539,361, for example, may alternatively be employed.

The waterborne damping composition of the present invention also includes from 0.1% to 50%, preferably from 1% to 20%, and more preferably from 3% to 10%, by solids based on emulsion polymer solids, of a liquid compound having a boiling point greater than 150° C., alternatively greater than 175° C., or further alternatively greater than 200° C. The liquid typically has a viscosity of lower than 25,000 mPa*s, preferably lower than 16,000 mPa*s, at 25° C. as measured by ASTM D445. The liquid compound is selected from the group consisting of acid group-reactive liquid compounds and non-acid group-reactive liquid compounds. By "acid group-reactive liquid compounds" is meant herein that the extent of reaction with the acid group monomers of the emulsion polymer is greater than 5% of the stoichiometrically potential reaction at a temperature of 150° C. in 30 minutes. By "non-acid group-reactive liquid compounds" is meant herein that the extent of reaction with the acid group monomers of the emulsion polymer is from 0% to 5% of the stoichiometrically potential reaction at a temperature of 150° C. in 30 minutes. Typical non-acid group-reactive liquid compounds include compounds commonly known as, for example, coalescents and plasticizers. Plasticizer and coalescent herein refer to liquid compounds that lower the minimum film formation temperature of the emulsion polymer. Typical acid group-reactive liquid compounds include functional compounds such as, for example, epoxy-functional resins. Preferred are epoxy-functional resins having a calculated epoxide equivalent weight of from 105 to 250. The calculated epoxide equivalent weight is determined based on the nominal structure of the resin, by dividing the total molecular weight of the epoxy-functional resin by the number of epoxy groups in the epoxy-functional resin. For mixtures of two or more epoxide resins it is preferred that the calculated epoxide equivalent of each of the components is in the claimed range. The liquid compound may itself be a waterborne dispersion and may be added to the emulsion polymer directly or to the filler-containing emulsion polymer.

The waterborne damping composition of the present invention includes solid filler at a level such that the waterborne damping composition has a percent pigment volume concentration ("PVC") of from 25% to 85%, preferably from 50% to 85%.

The pigment volume concentration is calculated by the following formula:

PVC (%)=volume of pigment(s)+volume extender (s)×100/total dry volume of paint

Typical fillers include, for example, inorganic particles such as calcium carbonate, titanium dioxide, kaolin, silicates, iron oxide, and the like; organic particles such as polymer particles, for example, polystyrene and polyvinyl chloride beads, expandable polymeric microspheres, synthetic or natural fibers, and microsphere pigments containing voids or vesicles. Microsphere pigments include polymer particles containing one or more voids such as, for example, ROPAQUE™ opaque polymers and vesiculated polymer particles.

The waterborne damping composition has a water content of from 6% to 25%, preferably of from 6% to 20%, and more preferably of from 6% to 16%, by weight.

The waterborne damping composition is prepared by techniques that are well known in the coatings art. First, one or more filler(s) are dispersed in a waterborne medium or predispersed fillers(s), or mixtures thereof are used. Then the waterborne emulsion polymer is added under low shear stirring along with other coatings adjuvants as desired. Alternatively, the emulsion polymer may be present with the filler during the dispersion stage. The liquid compound may be added at any stage. The waterborne damping composition may contain, in addition conventional coatings adjuvants such as, for example, antifreezes, curing agents, buffers, neutralizers, thickeners, rheology modifiers, humectants, wetting agents, biocides, antifoaming agents, UV absorbers, fluorescent brighteners, light or heat stabilizers, biocides, chelating agents, dispersants, colorants, waxes, water-repellants, and anti-oxidants.

The waterborne damping composition is typically applied to a substrate such as, for example, metal, plastics, previously painted or primed surfaces, and weathered surfaces. The waterborne damping composition may be applied to a substrate using conventional coatings application methods such as, for example, air-atomized spray, air-assisted spray, airless spray, high volume-low pressure spray, and air-assisted airless spray.

Drying of the waterborne damping composition may be effected, for example, at from 25° C. to 250° C., preferably at from 100° C. to 200° C. Without being bound by a particular theory, it is expected that in certain embodiments the acid groups of the waterborne emulsion polymer react with reactive groups of the liquid compound such as, for example, with the epoxy functionality of an epoxy resin, preferably at a temperature of, for example, 150° C. to 180° C., that in turn engenders improved water resistance of the dried waterborne damping composition.

The following non-limiting examples are presented to illustrate the invention.

TEST METHODS

Water Resistance

Water uptake was evaluated by drawing down 4 mm wet thickness, 100 mm length, and 80 mm width of waterborne damping sample onto aluminum panels. The samples were allowed to dry for a predetermined amount of time of from 0-48 hours at room temperature and then placed in an oven at 150° C. for 30 minutes. Mass % water in formulation was measured by weighing the sample before and after baking. Samples were cooled at ambient room temperature and completely submerged in tap water for up to 48 hours. The panel and exterior of the coating were gently wiped dry. Water uptake was reported as a percent of coating mass after 24 and 48 hours.

Appearance of Dried Damping Coatings

Appearance was evaluated on a scale from 1-10 as defined below.

10: No trace surface defects
8: Slight bumps, craters, holes/pinholes
6: Moderate bumps, craters, holes/pinholes
4: Heavy bumps, craters, holes/pinholes
2: Severe bumps, craters, holes/pinholes Vibrational Damping Composite Loss Factor (CLF) is a measure of vibrational damping. CLF was evaluated by forming a coating on 1.6 mm thick×12.7 mm width×200 mm length hardened carbon steel Oberst bars, following ASTM e-757. CLF curves were reported for a frequency interpolation of 200 Hz. Coating coverage and thickness were reported in the data legends as CLF is dependent on coverage.

$$CLF \cong A \times \left(\frac{E'_{Coating}}{E'_{Substrate}}\right) \times \left(\frac{h_{Coating}}{h_{Substrate}}\right)^2 \times (\tan \delta_{Coating})$$

Where:
CLF: Composite Loss Factor (unitless)
A: Constant (unitless)
$E'_{Coating}$: Storage Modulus of the Viscoelastic Layer (MPa)
$E'_{Substrate}$: Storage Modulus of the Substrate (MPa)
$h_{Coating}$: Thickness of the Viscoelastic Layer (mm)
$h_{Substrate}$: Thickness of the Substrate (mm)
Tan $\delta_{Coating}$: Tan Delta of the Viscoelastic Layer (unitless)
Epoxy Resins Used in the Examples.

| Material | Functionality | Chemical Composition | Calculated Epoxide Equivalent Weight |
|---|---|---|---|
| DER 331 | Di-functional | C21—H24—O4 | 170 |
| HELOXY ™ 61 | Mono-functional | C7—H14—O2 | 130 |
| HELOXY ™ 62 | Mono-functional | C10—H12—O2 | 164 |
| HELOXY ™ 67 | Di-functional | C10—H18—O4 | 101 |
| HELOXY ™ 68 | Di-functional | C11—H20—O4 | 108 |
| HELOXY ™ 48 | Tri-functional | C15—H18—O6 | 101 |
| C8 alkyl glycidyl ether | Mono-functional | C11H22—O2 | 186 |
| C10 alkyl glycidyl ether | Mono-functional | C13—H26—O2 | 214 |

EXAMPLE 1 (COMPARATIVE). WATERBORNE COATING COMPOSITION ABSENT LIQUID COMPOUND 80 g of a waterborne emulsion polymer including copolymerized phosphoethyl methacrylate and having a calculated acid number of 7.6 (50% solids), 0.5 g BYK-093 (BYK), 0.32 g BAYFERROX™ 318M, 125 g TITAN™-200, 0.3 g EXPANCEL™ 031WUFX40, and 4 g KOLLOTEX™ 1500 were mixed together for 15 minutes using a standard overhead mixer. 0.4 g of ACRYSOL™ RM12-W was added under further mixing.

EXAMPLES 2-10

Waterborne damping compositions were prepared according to the process of Comparative Example 1 except for including 135 g of TITAN™-200 (to increase filler for the added ingredients following to keep the PVC the same) and 4 g Diisononyl phthalate (DINP), OPTIFILM™ 400, triethylene glycol sorbate ester (as described in WO 2015157929 A1), HELOXY™ 61, HELOXY™ 62, HELOXY™ 67, HELOXY™68, HELOXY™48, or C8-C10 alkyl glycidyl ether (Sigma Aldrich), respectively, were also added under mixing.

EXAMPLE 11 was prepared according to the process of Comparative Example 1 but 152 g of TITAN™-200 and 4 g of HELOXY™ 61 was also added under mixing.

EXAMPLES 12 (Comp.) AND 13 (Comp.)

were prepared according to the process of Comparative Example 1 but 98 g or 140 g of DURCAL™-10 was added respectively to adjust the PVC.

EXAMPLE 14

Water pickup performance of Comparative Examples 1, 7-9, and 12-13 and Examples of the invention 2-6 and 10-11 at 0 hr open time.

| Example | % water | PVC | Appearance | WPU 24 hr. | WPU 48 hr. |
|---|---|---|---|---|---|
| 1 (Comp.) | 22 | 55 | 4 | 15.1 +/− 5.3 | 27.3 +/− 4.6 |
| 2 | 15 | 55 | 7 | 4.9 +/− 1.4 | 7.5 +/− 0.8 |
| 3 | 15 | 55 | 7 | 3.6 +/− 0.9 | 5.5 +/− 0.1 |
| 4 | 15 | 55 | 5 | 1.7 +/− 0.2 | 2.2 +/− 0.3 |
| 5 | 15 | 55 | 4 | 0.6 +/− 0.1 | 0.8 +/− 0.2 |
| 6 | 15 | 55 | 5 | 1.1 +/− 0.1 | 1.9 +/− 0.2 |
| 7 | 15 | 55 | 7 | 24.9 +/− 0.8 | 34.8 +/− 3.4 |
| 8 | 15 | 55 | 4 | 9.5 +/− 1.3 | 17.5 +/− 2.1 |
| 9 | 15 | 55 | 6 | 14.8 +/− 1.7 | 27.7 +/− 4.6 |
| 10 | 15 | 55 | 5 | 1.6 +/− 0.1 | 2.4 +/− 0.3 |
| 11 | 15 | 58 | 6 | 0.6 +/− 0.1 | 0.6 +/− 0.1 |
| 12(Comp.) | 24 | 50 | 1 | 1.2 +/− 0.1 | 1.5 +/− 0.3 |
| 13(Comp.) | 19 | 58 | 7 | 22.3 +/− 3.8 | 45.3 +/− 4.5 |

Examples 2-11 provide improved performance relative to the Comparative Examples. Examples 7 and 9 provide improved appearance relative the Comparative Example 1, but not improved water pickup and are not preferred compositions.

EXAMPLE 15

CLF performance of Comparative Example 1 and Examples 2-5

| Example | CLF Peak Height | CLF Peak Temp. (C.) | Avg. Coverage Kg/m2 | Avg. Thickness mm |
|---|---|---|---|---|
| 1(Comp.) | 0.21 | 27 | 4.3 | 3.8 |
| 2 | 0.24 | 14 | 4.4 | 3.6 |
| 3 | 0.21 | 11 | 4.3 | 3.6 |
| 4 | 0.19 | 24 | 4.5 | 2.9 |
| 5 | 0.20 | 26 | 4.4 | 3.2 |

Examples 2-5 of the present invention provide a desirable level of damping performance.

EXAMPLES 16-20

Evaluation of water uptake for dry waterborne compositions, examples including a waterborne emulsion polymer including copolymerized phosphoethyl methacrylate and having a calculated acid number of 8.4 and a diepoxy-functional liquid compound (D.E.R.331)

TABLE 16.1

Waterborne compositions

| Component | Ex. 16 (Comp.) | Ex. 17 | Ex. 18 | Ex. 19 | Ex. 20 |
|---|---|---|---|---|---|
| Emulsion polymer | 26.58 | 25.83 | 25.44 | 24.39 | 23.44 |
| D.E.R.331 (65% solids) | 0 | 0.60 | 0.98 | 1.88 | 2.70 |
| FOAMASTER ™ NXZ | 0.15 | 0.15 | 0.15 | 0.15 | 0.15 |
| TAMOL ™ 1254 | 0.52 | 0.52 | 0.52 | 0.52 | 0.52 |
| UCD ™1530E Black | 0.46 | 0.46 | 0.46 | 0.46 | 0.46 |
| HUBERCARB ™ Q-325 | 60.84 | 60.51 | 60.48 | 60.14 | 59.85 |
| EXPANCEL ™ 031WUFX40 | 0.28 | 0.28 | 0.28 | 0.27 | 0.27 |
| PENFORD ™ Gum 200 | 1.94 | 1.93 | 1.92 | 1.91 | 1.90 |
| ACRYSOL ™ ASE-60 | 1.42 | 1.58 | 1.51 | 1.44 | 1.29 |
| Water | 7.81 | 8.15 | 8.26 | 8.84 | 9.42 |
| Total | 100.00 | 100.00 | 100.00 | 100.00 | 100.00 |
| Water Uptake (24 hr.) | 29.3% | 11.6% | 9.9% | 10.2% | 10.4% |

Examples 17-20 of the invention provide dry coatings having superior water pickup results relative to the Comparative Example 16 that is absent a liquid compound (difunctional epoxy).

Note: ACRYSOL™, TAMOL™, and ROPAQUE™ are trademarks of The Dow Chemical Company. BAYFER- ROX™ is a trademark of Lanxess AG. TITAN™ and DURCAL™ are trademarks of Omya Inc. EXPANCEL™ is a trademark of AkzoNobel N.V. KOLLOTEX™ is a trademark of Avebe GmbH. OPTIFILM™ is a trademark of Eastman Chemical Company. HELOXY™ is a trademark of Hexion, Inc. UCD™ is a trademark of Chromaflo Technologies. HUBERCARB™ is a trademark of JM Huber Corp. PENFORD™ is a trademark of Penland Products Co.

What is claimed is:

1. A waterborne damping composition comprising:
   a waterborne emulsion polymer, said polymer having a calculated acid number of from 2 to 100; from 0.1% to 50%, solids based on emulsion polymer solids, of a liquid compound having a boiling point greater than 150° C. which is an acid group-reactive liquid compound having epoxide functionality; and a solid filler; wherein said waterborne damping composition has a PVC of from 25% to 85%; and wherein said waterborne damping composition has a water content of from 6% to 25% by weight.

2. The waterborne damping composition of claim 1 wherein the calculated acid number of said polymer is from 2 to 65.

3. The waterborne damping composition of claim 1 wherein the water content of said waterborne damping composition is from 6% to 20% by weight.

4. The waterborne damping composition of claim 1 wherein said acid-group-reactive liquid compound is an epoxy-functional resin having a calculated epoxide equivalent weight of from 105 to 250.

5. A method for providing a coated substrate comprising:
   (a) forming a waterborne damping composition comprising:
   a waterborne emulsion polymer, said polymer having a calculated acid number of from 2 to 100; from 0.1% to 50%, solids based on emulsion polymer solids, of a liquid compound having a boiling point greater than 150° C. which is an acid group-reactive liquid compound having epoxide functionality; and a solid filler; wherein said waterborne damping composition has a PVC of from 25% to 85%; and wherein said waterborne damping composition has a water content of from 6% to 25% by weight;
   (b) applying said waterborne damping composition to a substrate; and
   (c) drying said applied waterborne damping composition at a temperature of from 25° C. to 250° C.

6. The method for providing a coated substrate of claim 5 wherein the acid number of said polymer is from 2 to 65.

7. The method for providing a coated substrate of claim 5 wherein the water content of said waterborne damping composition is from 6% to 25% by weight.

8. The method for providing a coated substrate of claim 5 wherein said acid-group-reactive liquid compound is an epoxy-functional resin having a calculated epoxide equivalent weight of from 105 to 250.

9. A coated substrate formed by the method of claim 5.

10. The coated substrate of claim 9 wherein the 48 hour water pickup of said coating is less than 25% by weight.

11. The coated substrate of claim 9 wherein the 24 hour water pickup of said coating is less than 15% by weight.

12. The waterborne damping composition of claim 1 wherein said acid-group-reactive liquid compound is an epoxy-functional resin.

13. The method of claim 5 wherein said acid-group-reactive liquid compound is an epoxy-functional resin.

* * * * *